Nov. 1, 1932.  I. W. WOOD  1,885,666
COFFEE POT
Filed March 14, 1932   2 Sheets-Sheet 1

INVENTOR
Irving W. Wood
By [signature]
His attorney

Nov. 1, 1932.   I. W. WOOD   1,885,666
COFFEE POT
Filed March 14, 1932   2 Sheets-Sheet 2
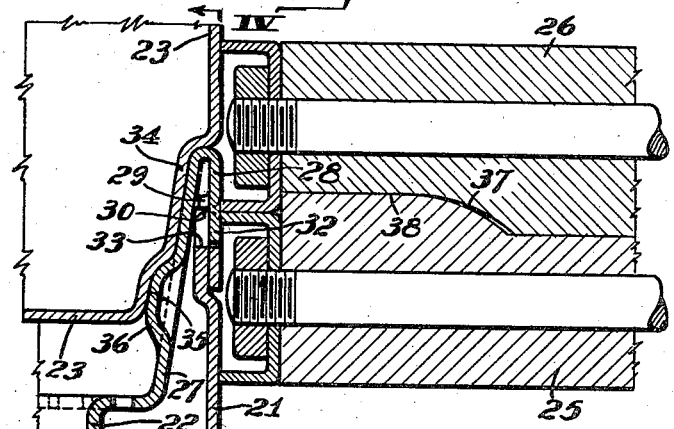
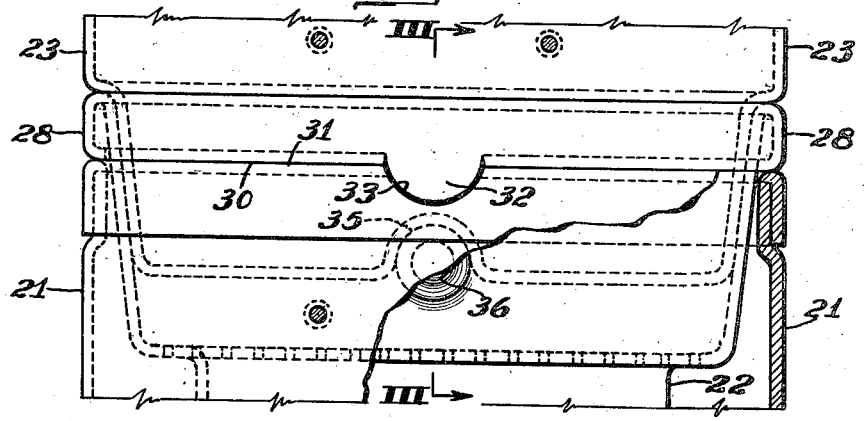
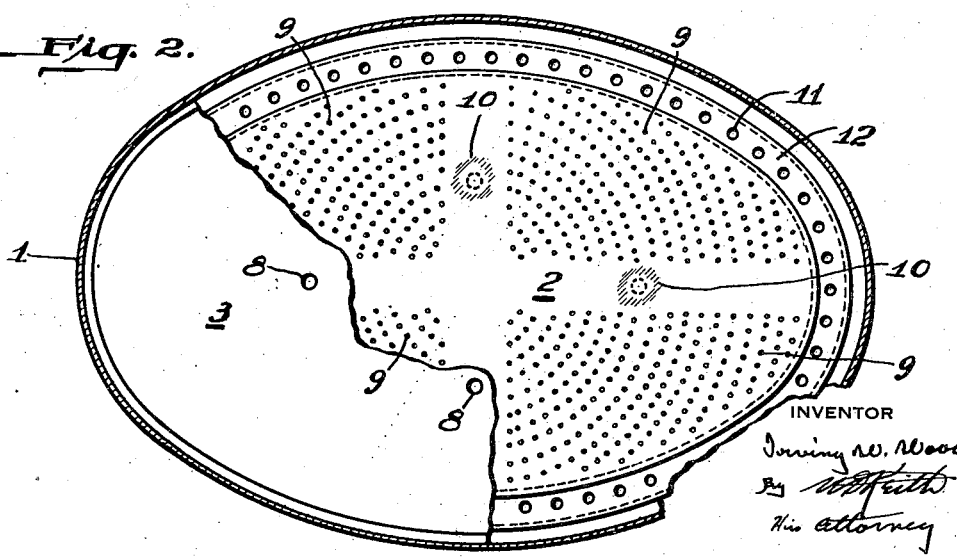
INVENTOR
Irving W. Wood
By
His Attorney Patented Nov. 1, 1932

1,885,666

UNITED STATES PATENT OFFICE

IRVING W. WOOD, OF NEW KENSINGTON, PENNSYLVANIA, ASSIGNOR TO THE ALUMINUM COOKING UTENSIL COMPANY, OF NEW KENSINGTON, PENNSYLVANIA, A CORPORATION OF PENNSYLVANIA

COFFEE POT

Application filed March 14, 1932. Serial No. 598,608.

The invention relates to coffee pots of the type known as drip coffee makers, and more particularly to an improved design of water reservoir and coffee container therefor.

It is an object of my invention to provide a drip coffee pot which can be used without filter paper and which will produce clear, full-flavored coffee without the necessity of recirculation.

A more particular object of my invention is the provision of a drip coffee pot in which the apertures in the bottom of the water reservoir are so arranged and located with respect to the apertures or perforations in the bottom of the coffee container that the water dripping from the apertures in the reservoir will percolate uniformly through the coffee grounds and will not "by-pass" the coffee grounds.

The type of drip coffee pot most generally used prior to the time of my invention required the use of filter paper which was usually inserted between the coffee grounds and the bottom of the coffee container. Sometimes this filter paper was inserted between a perforated plate and the bottom of the coffee container, and the coffee grounds were placed on top of this perforated plate, although it was quite common to place the coffee grounds directly on top of the filter paper. Prior to the time of my invention, however, many designs have been proposed in which filter paper was not required or was not used. These designs have not proved altogether satisfactory and have been open to the objection that coffee made in this type of pot without the use of filter paper was not clear and free from coffee grounds or was not full-flavored. According to my observation, one of the principal defects in this type of pot may be attributed to the fact that water dripping from the reservoir has a tendency to splash into the coffee grounds in such a way as to form pits or depressions therein directly below each of the apertures in the reservoir. The result of this action was, in the last analysis, uneven percolation. After the formation of such pits or depressions in the mass of coffee grounds, the water no longer passed through the full depth of the mass but by-passed a portion, and sometimes a major portion, of the grounds. In extreme cases, the grounds were splashed or washed aside to an extent sufficient to allow the water to drip through the coffee container without obtaining any appreciable percolating action. To offset this condition, it was necessary, in order to obtain full-flavored coffee of the desired strength, to use a greater quantity of coffee grounds, which, of course, was neither economical nor desirable. It was the recognition of this and other disadvantages inherent in previous designs of pots which led to the present invention. Further objects and advantages of my invention will appear from a consideration of the specific embodiments which will now be described in connection with the accompanying drawings in which:

Fig. 2 is a view (to a slightly enlarged scale) of the coffee container and water reservoir taken in the direction of the arrows II—II in Fig. 1, and in which a portion of the coffee container has been broken away to more clearly illustrate the apertures in the bottom of the water reservoir;

Fig. 3 is a fragmentary vertical sectional view to an enlarged scale taken on line III—III of Fig. 4, showing a modified form of the invention.

Fig. 4 is a fragmentary view taken on the line IV—IV of Fig. 3, a portion of the coffee receiver having been broken away to more clearly illustrate the aligning means.

Figure 1:
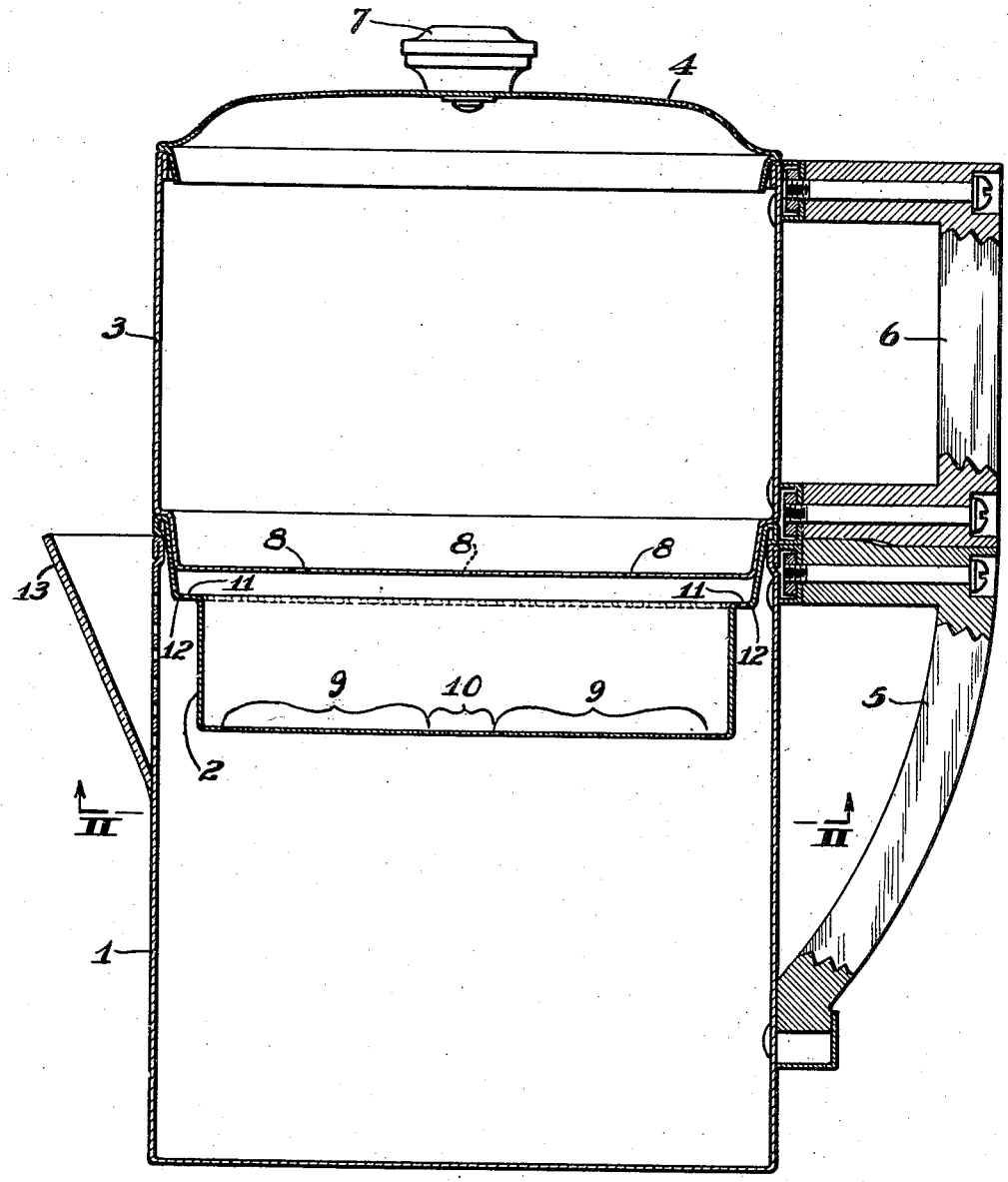
Fig. 1 is a vertical sectional view through a coffee maker embodying the invention.

With particular reference to the embodiment illustrated in Figs. 1 and 2, my improved coffee pot comprises a coffee receiver, designated generally by the reference numeral 1, a receptacle 2 known as the coffee container, and a water reservoir 3 with its cover member 4. The coffee receiver 1, reservoir 3, and cover 4 are conveniently provided with handle members 5, 6, and 7, respectively, secured in any well known manner.

The coffee receiver 1, container 2, and reservoir 3 are arranged to nest one in another as indicated clearly in Fig. 1.

It is an essential feature of my invention that the reservoir 3 be held in positive alignment with respect to the coffee container 2. In the embodiment illustrated in Figs. 1 and 2 this is accomplished by means of the shape or contour of the pot which, in the particular design adopted for purposes of illustration, is oval or elliptical, as will be seen in Fig. 2. It is obvious that in this design of pot the coffee receiver 1, container 2, and reservoir 3 can be assembled in only one correct relationship. In the case of a round pot, other aligning means must be provided as will further appear in connection with a description of another embodiment of the invention.

Water reservoir 3 is provided with a plurality of apertures 8 of such a size as to allow the water to flow or drip into the coffee container 2 at the proper rate. The coffee container 2 is preferably provided with a much larger number of apertures or perforations 9 which I prefer to make of a much smaller size and which should be of such a size as to prevent the fine coffee grounds from passing through into the coffee receiver. The diameter of the apertures in the reservoir will be determined in part by the number of openings which it is desired to provide therein. It is to be understood that my invention is not limited to the particular number or arrangement of apertures shown.

Directly below each of the apertures 8 in the water reservoir is an imperforate area 10 of the bottom of the coffee container. This imperforate area 10 preferably extends for an appreciable distance around a center which is given by projecting apertures 8 vertically upon the bottom of the container 2 (as indicated by the shade lines on Fig. 2). In the preferred form of my invention these imperforate areas are extended in the form of a cross, forming the major and minor axes of an ellipse. With such a construction, the design and maintenance of the punches or perforating tools is simplified. The perforating tool may conveniently be made in two or four segments whereby one segment, if defective or worn, can be replaced independently of the others so that it will be unnecessary to replace or repair the entire tool assembly. The row of perforations 11 formed in the shoulder 12 of the coffee container 2 allows the escape of air upwardly as the coffee liquid rises in the receiver 1, but this forms no part of the present invention and is merely illustrated for the purpose of disclosing a complete operative assembly. The receiver 1 is provided with the usual pouring lip or spout 13.

Figs. 3 and 4 illustrate a modified form of the invention in which the same relationship obtains between the apertures formed in the water reservoir and coffee container as in the form just described, but in which, because the pot is round rather than oval, it is necessary to provide special auxiliary aligning means which will perform the aligning function inherent in the oval form of pot. It will be understood, however, that the auxiliary aligning means disclosed in Figs. 3 and 4 may if desired be embodied in the design of pot shown in Figs. 1 and 2. Thus the principal elements of the combination, namely, the reservoir, coffee container and coffee receiver, fragmentarily shown in Figs. 3 and 4 may be of the exact form illustrated in Figs. 1 and 2 or may be of the same form except that they are round instead of oval. In any case, as has been noted, the same relationship obtains between the location of the apertures in the reservoir and that of the apertures in the coffee container.

The coffee receiver 21, coffee container 22, water reservoir 23, and handles 25 and 26 correspond respectively to the members 1, 2, 3, 5 and 6 of Figs. 1 and 2. The upper part of the coffee receptacle 22 is formed with an inclined wall portion 27 which at its upper edge is beaded over as at 28. The bead 28 is turned inwardly as at 29 to form a shoulder 30 which is designed to rest on the upper edge 31 of the coffee receiver 21. The bead 28 is provided with a downwardly extending projection or aligning tab 32 which is arranged to cooperate with a notch 33 formed in the upper edge of the coffee receiver 21 in preventing relative circumferential movement between the coffee receiver and the coffee container. I prefer that the projection 32 and notch 33 be located opposite the points of attachment of the handle members 25, 26 so that when the parts are assembled they will be hidden from view and thus not detract from the appearance of the utensil.

The water reservoir 23 is provided near its lower edge with an inclined wall portion 34 arranged to conform with the inclined upper wall portion 27 of the coffee receptacle 22. At the point of juncture of the inclined wall portion 34 with the bottom of reservoir 23 there is provided a depression 35 which is arranged to receive a corresponding projection 36 formed in the inclined wall 27 of the coffee container 22. This forms an interlock between the coffee container and the water reservoir which effectively prevents relative circumferential movement therebetween. I prefer that this interlocking or aligning means provided by the depression 35 and projection 36 formed in the reservoir and receptacle respectively be positioned adjacent or near the previously described aligning means between the coffee receptacle 22 and receiver 21.

With the aligning means inherent in the oval type of pot disclosed in Figs. 1 and 2, or with the aligning means disclosed in Figs. 3 and 4 which is particularly applicable to a round pot, it will be seen that I have provided a construction in which a water reservoir having apertures in its lower portion and a coffee container having apertures in its lower portion are arranged to be so positioned with respect to one another that the lower portion of the coffee container will have an imperforate area below each of the apertures in the water reservoir, the aforesaid aligning means providing for the maintenance of this relationship.

If desired, a further aligning means may be provided between the receiver 21 and reservoir 23 by means of a projection 37 formed on the upper side of the handle member 25 and a corresponding depression or recess 38 in the bottom of handle member 26. While I have described three sets of aligning means, it will be apparent that the only alignment which is essential for the realization of the benefits conferred by my invention is that between the receptacle 22 and reservoir 23. The other aligning means disclosed, however, are of assistance when assembling the three units which are comprised in the complete assembly.

The manner of use of my improved coffee pot is similar to that of previously known drip coffee pots and may be described briefly as follows: Coffee receptacle 2 or 22 is assembled with coffee receiver 1 or 21 and the coffee grounds are distributed uniformly over the bottom of the coffee receptacle. The water reservoir 3 or 23 is then nested into the receptacle 2 or 22 and the proper quantity of boiling water poured into the reservoir. As soon as the entire quantity of water has percolated through the coffee grounds into the receiver 1 or 21, the reservoir and the receptacle containing the spent coffee grounds may be removed.

While in describing my invention I have in the interest of clarity employed specific language, I have no intention in the use of such language of excluding any equivalents or minor variations of the invention set forth.

I claim:

In a coffee pot, a water reservoir having apertures in its lower portion, a coffee container below the water reservoir, said coffee container having apertures in its lower portion, the lower portion of the coffee container having an imperforate area below each of the apertures in said water reservoir, and means for positively aligning said water reservoir with respect to said coffee container whereby the imperforate portions of the latter are maintained in a position directly below the apertures in the former.

In testimony whereof I hereto affix my signature.

IRVING W. WOOD.